United States Patent [19]

Fukazawa et al.

[11] Patent Number: 5,418,656
[45] Date of Patent: May 23, 1995

[54] DROP-OUT DETECTING CIRCUIT

[75] Inventors: Hiromi Fukazawa; Masahiro Ikeda, both of Nagano, Japan

[73] Assignee: Sankyo Seiki Mfg. Co., Ltd., Nagano, Japan

[21] Appl. No.: 972,174

[22] Filed: Nov. 4, 1992

[30] Foreign Application Priority Data

Nov. 5, 1991 [JP] Japan ................... 3-288745
Jan. 20, 1992 [JP] Japan ................... 4-007230

[51] Int. Cl.⁶ ............................................... H04N 5/94
[52] U.S. Cl. ................................. 360/38.1; 327/72; 327/336
[58] Field of Search ............... 307/351, 353, 354, 358, 307/355, 356; 328/149, 150, 151; 360/38.1, 72.2; 358/8

[56] References Cited

U.S. PATENT DOCUMENTS

| | | | |
|---|---|---|---|
| 4,032,966 | 6/1977 | Kenney et al. | 358/8 |
| 4,234,867 | 11/1980 | Butin | 307/358 |
| 4,524,351 | 6/1985 | Kimura et al. | 307/356 |
| 4,689,501 | 8/1987 | Schoofs et al. | 307/354 |
| 4,847,709 | 7/1989 | Uehara et al. | 360/72.2 |
| 4,864,167 | 9/1989 | McKibben et al. | 307/358 |
| 4,910,753 | 3/1990 | Wakatsuki et al. | 307/358 |
| 4,937,680 | 6/1990 | Kawasaki | 360/38.1 |
| 5,003,196 | 3/1991 | Kawaguchi | 307/358 |
| 5,223,946 | 6/1993 | Mannen | 360/38.1 |

Primary Examiner—Thomas M. Dougherty
Assistant Examiner—Shawn Riley
Attorney, Agent, or Firm—McAulay Fisher Nissen Goldberg & Kiel

[57] ABSTRACT

To set the drop-out detection level constant in the drop-out detecting circuit used for a magnetic recording apparatus, without regulating the output level of a magnetic recording head and the gain of a preamplifier, the detecting circuit comprises an envelope detection section for detecting the envelope of a reproduced signal; a voltage division section for dividing the output signal voltage of the envelope detection section; and a comparator for comparing the output signal of the voltage division section with the reproduced signal to detect a drop-out of the reproduced signal. Therefore, it is possible to reduce the number of parts and the number of adjustment process to reduce the manufacturing cost thereof. Further, to detect the drop-out portion throughout as defective tape locations, irrespective of the length of the drop-out portion, the detecting circuit further comprises a drop-out start detection section, a drop-out end detection section, and an OR gate.

2 Claims, 7 Drawing Sheets

DROP-OUT DETECTING CIRCUIT

BACKGROUND OF THE INVENTION

1. Field of the Invention

The present invention relates to a drop-out detecting circuit for detecting drop-outs of a reproduced signal, which is suitable for use in a high density magnetic recording apparatus for backing up data.

2. Description of the Related Art

In a magnetic recording apparatus such as a high density magnetic recording apparatus for data backup, for instance, it is required to secure reproduction reliability when data are reproduced from a magnetic tape through a magnetic reproducing head. For this purpose, when data are recorded on a magnetic tape by a magnetic recording head, the data recorded on the magnetic tape are reproduced and then checked, immediately after the data have been recorded, by the magnetic reproducing head installed just behind the magnetic recording head. More specifically, when the level of the signal reproduced by the magnetic reproducing head is lower than a predetermined level (when a drop-out is detected), the reproduced signal is isolated as a read error. Data which are the same as the isolated reproduced signal are recorded again (rewritten) on another location on the magnetic tape. Therefore, it is possible to prevent the drop-out portion of the data recorded on a magnetic tape from being used.

In the recording apparatus as described above, a drop-out detecting circuit detects the fact that the level of the signal reproduced by the magnetic reproducing head is lower than that of a reference voltage level, that is, there exists a dropout of the reproduced signal.

Figure 8:
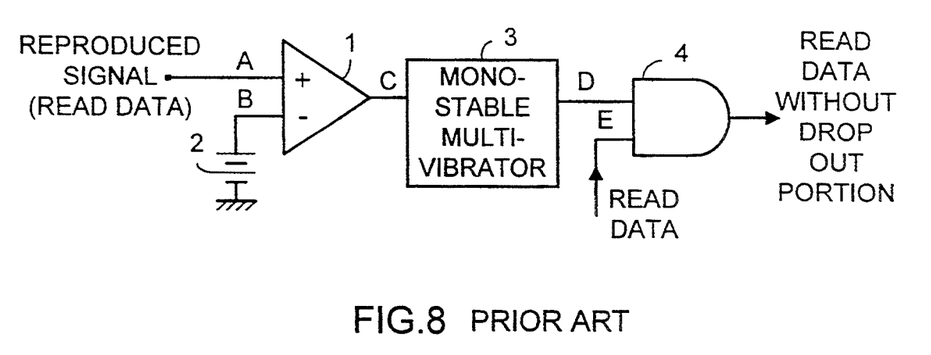
FIG. 8 is a schematic block diagram showing a prior art drop-out detecting circuit.
Figure 9:
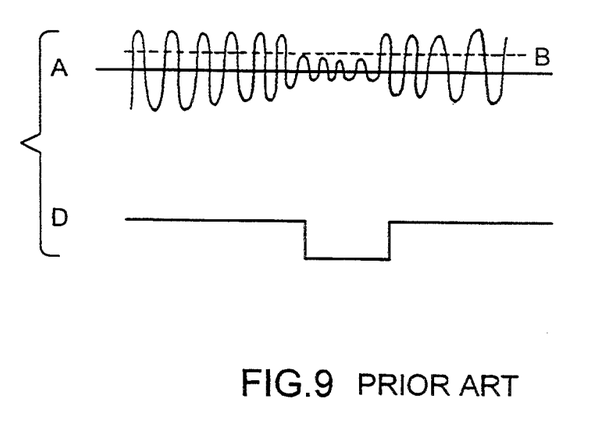
FIG. 9 is a timing chart for assistance in explaining the operation of the prior art detecting circuit.

FIG. 8 shows a prior art drop-out detecting circuit, by way of example, and FIG. 9 shows a timing chart of the same circuit.

In the high density magnetic recording apparatus for data backup, data are divided into blocks and recorded on a magnetic tape through the magnetic recording head. The signal reproduced from the magnetic tape is first amplified by a preamplifier (not shown) and then inputted to a non-inversion input terminal of a comparator 1 as read data A. The read data or reproduced signal A is compared with a reference voltage signal B inputted from a reference voltage supply 2 to an inversion input terminal of the comparator 1 to detect the presence of any drop-out. In response to the leading edge of an output signal C (drop-out signal) of the comparator 1, a monostable multivibrator 3 is triggered to generate a pulse signal D with a predetermined pulse width. The width of this pulse signal D with respect to time is determined to be longer than the longest data time period. The pulse signal 25 D having the above-mentioned pulse width is outputted to an AND gate 4. On the other hand, an output signal of the preamplifier is passed through a low-pass filter (not shown) and then differentiated through a differentiation circuit (not shown). The differentiated signal is compared with a zero cross point through a zero-cross comparator (not shown), and then provided as read data E. This read data E is applied to the AND gate 4. Therefore, the read data E from which the drop-out portion is removed on the basis of the output signal D of the monostable multivibrator 3 is outputted through the AND gate 4 to a demodulator (not shown).

In the above-mentioned prior art drop-out detecting circuit, however, the level of the reproduced signal A supplied to the comparator 1 fluctuates due to fluctuations of the output level of the magnetic reproducing head and the gain of the preamplifier. Therefore, in order to set the level at which the drop-out is detected (the reference voltage level B of the reference supply voltage 2) to a predetermined ratio of the maximum level of the reproduced signal A, it is necessary to regulate the gain of the preamplifier and the level of the reference voltage B of the reference voltage supply 2. This results in an increase in manufacturing cost due to increases in the number of the electrical parts and the steps of circuit adjustment or assembly.

SUMMARY OF THE INVENTION

With these problems in mind, it is a primary object of the present invention to provide a drop-out detecting circuit, which can improve the above-mentioned drawbacks and by which the drop-out detecting level can be regulated to a predetermined value without any adjustment, irrespective of the fluctuations in the output level of the magnetic recording head and the gain of the preamplifier.

To achieve the above-mentioned object, the drop-out detecting circuit according to the present invention comprises: an envelope detection section for detecting an envelope of a reproduced signal; a voltage division section for dividing a voltage of an output signal of the envelope detection section; and a comparator for comparing an output signal of the voltage division section with the reproduced signal to detect a drop-out of the reproduced signal.

The drop-out detecting circuit further comprises: a dropout start detection section for detecting a drop-out start of the reproduced signal on the basis of the output signal of the comparator and for generating an output signal at a predetermined time after a drop-out start of the reproduced signal detected by the comparator; a drop-out end detection section for detecting a drop-out end of the reproduced signal on the basis of the output signal of the envelope detection section or the comparator and for generating an output signal at a predetermined time before the detected drop-out end; and logical means for generating an output signal when any one of the output signal of the drop-out end detection section and the output signal of the drop-out start detection section is being generated.

In the drop-out detecting circuit according to the present invention, it is possible to set the drop-out detection level constant, without regulating the output level of the magnetic recording head and the gain of the preamplifier, thus reducing the number of parts and the number of adjustment processes to reduce the manufacturing cost thereof.

Further, it is possible to detect the drop-out portion throughout as defective tape locations, irrespective of the length of the drop-out portion, in spite of the simple circuit configuration.

For a better understanding of the present invention, reference is made to the following description and accompanying drawings while the scope of the invention will be pointed out in the appended claims.

DETAILED DESCRIPTION OF THE PREFERRED EMBODIMENTS

With reference to the attached drawings, embodiments of the drop-out detecting circuit according to the present invention will be described in detail below.

Figure 1:
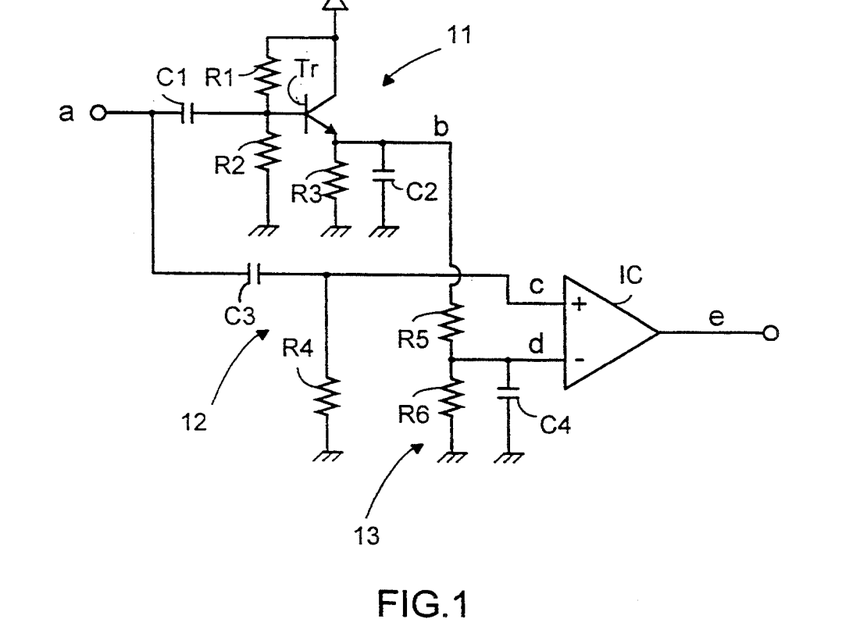
FIG. 1 is a circuit diagram showing a first embodiment of the drop-out detecting circuit according to the present invention.
Figure 2:
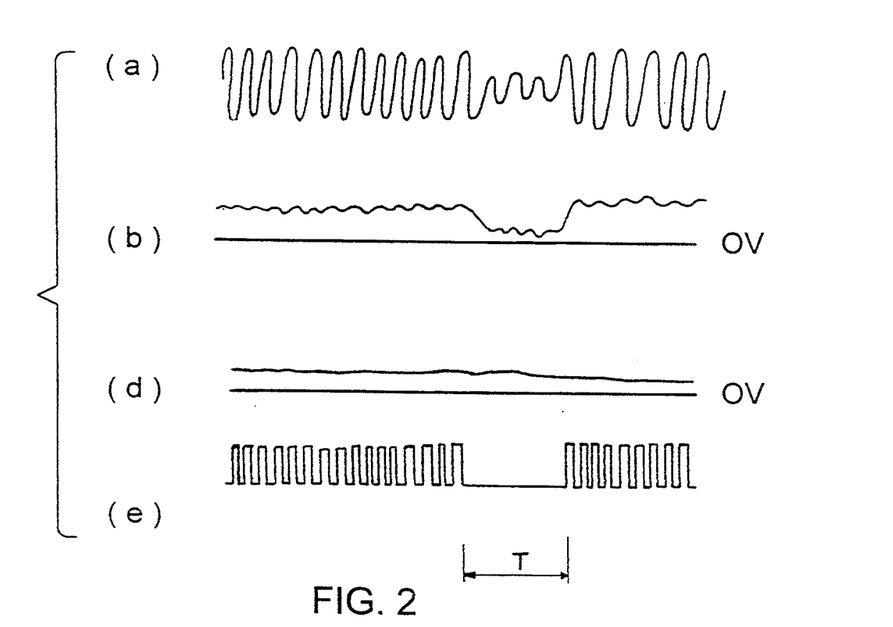
FIG. 2 is a timing chart for assistance in understanding the operation of the first embodiment shown in FIG. 1.

FIG. 1 show a first embodiment and FIG. 2 shows the timing chart thereof.

The circuit comprises an envelope detection section 11, a comparator IC, a time constant section 12 connected between an input terminal and a non-inversion input terminal of the comparator IC, and a voltage division smoothing section 13 connected between an output of the envelope detection section 11 and an inversion input terminal of the comparator IC.

The envelope detection section 11 is composed of a transistor Tr, resistors R1 to R3, and capacitors C1 and C2, to which an external reproduced signal a is supplied. The time constant section 12 is composed of a capacitor C3 and a resistor R4. The voltage division smoothing section 13 is composed of a voltage division section of two resistors R5 and R6 and a smoothing section of C4.

In the case of a magnetic recording apparatus such as a high density magnetic recording apparatus for data backup, data are divided into blocks and recorded on a magnetic tape through a magnetic recording head. Further, the signal reproduced from the magnetic tape through a magnetic reproducing head are amplified by a preamplifier (not shown) and then supplied to the envelope detection section 11. When the reproduced signal a includes a drop-out portion, for instance as shown in FIG. 2, the envelope detection section 11 detects the envelope of the reproduced signal a and outputs an envelope detection signal b as shown in FIG. 2. This envelope detection signal b is voltage-divided by the two resistors R5 and R6 and further smoothed by the capacitor C4 in the voltage division smoothing section 13, so that a reference voltage d as shown in FIG. 2 can be obtained. At the same time, the reproduced signal a provided by the preamplifier is passed through the time constant section 12 and then given to the non-inversion input terminal of the comparator IC as a signal c. The comparator IC compares the reproduced signal c with the reference voltage d, so that the comparator IC outputs an output signal e, whose voltage level is zero at the drop-out portion with a time interval T, also as shown in FIG. 2. The time interval T at which the voltage level is reduced down to zero is measured and compared with a predetermined value (the longest period of the output signal e of the comparator IC, obtained when the normal reproduced signal is supplied). When the time interval T exceeds the predetermined value, since this indicates that the time interval T is longer than the longest period of the output signal e, it is discriminated that there exists a drop-out in the reproduced signal a.

In the detection circuit of the present invention, since the time constant determined by the resistors R5 and R6 and the capacitor C4 of the voltage division smoothing section 13 is determined to be sufficiently longer that the drop-out duration time interval T, the drop-out detection level (reference voltage level d) is not lowered at the drop-out portion of the reproduced signal a, so that it is possible to eliminate the regulation of the level of the reference voltage d. Further, the drop-out detection level d (the voltage ratio to the maximum voltage of the reproduced signal a) can be determined freely by adjusting the ratio of the resistor R5 to the resistor R6.

In the above-mentioned first embodiment, a case exists where the drop-out cannot be detected reliably when the duration of the drop-out is very long or short.

A second embodiment of the present invention which can solve the above-mentioned problem will be described hereinbelow with reference to FIGS. 3 to 6, in which like reference numerals have been retained for similar parts or sections which have the same functions as with the case of the first embodiment previously described.

Figure 3:
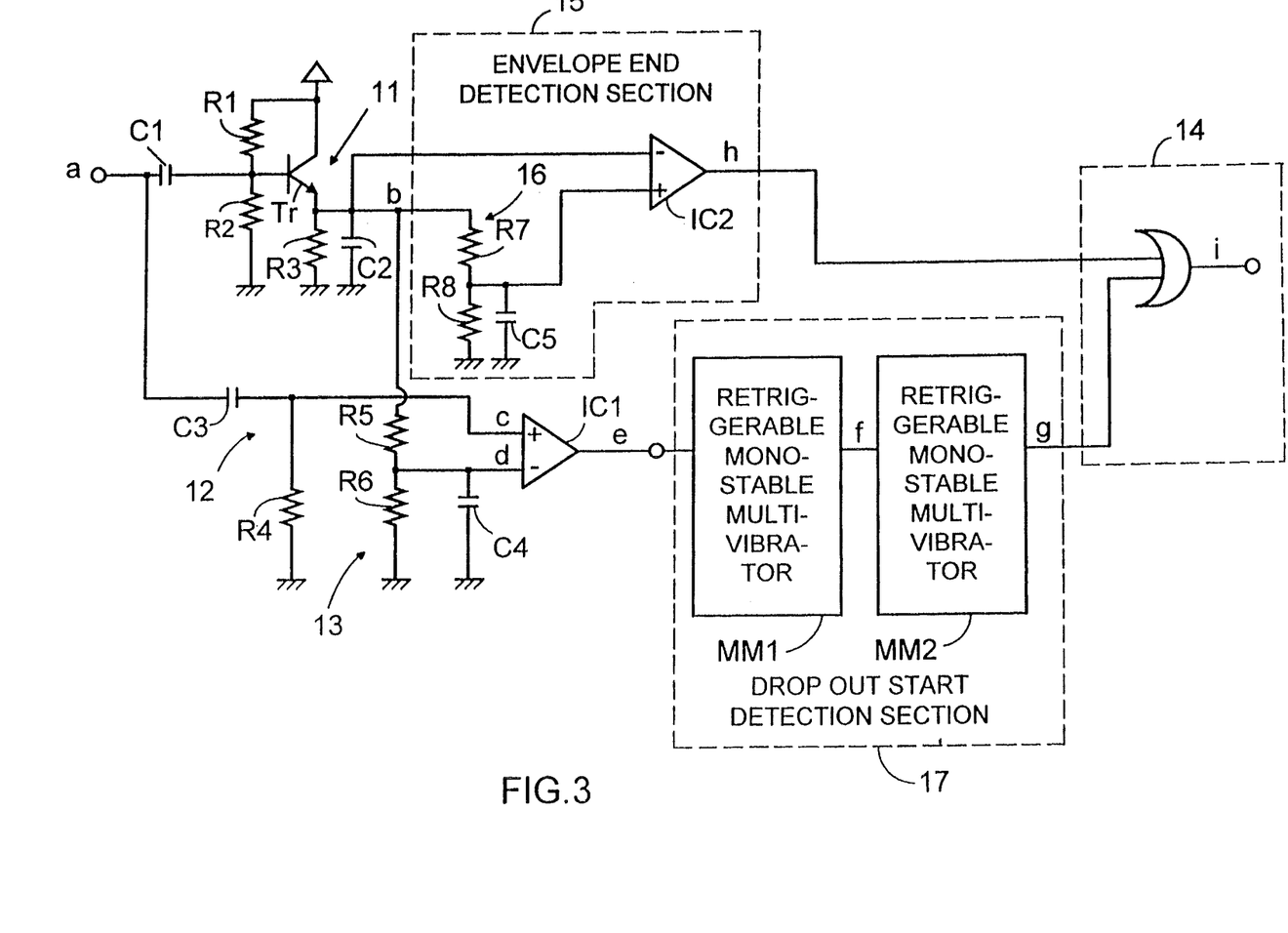
FIG. 3 is a circuit diagram showing a second embodiment of the drop-out detecting circuit according to the present invention.

As with the case of the first embodiment, an envelope detection section 11 is composed of three resistors R1 to R3 and two capacitors C1 and C2, to which an external reproduced signal a is supplied. A time constant section 12 is composed a capacitor C3 and a resistor R4, which is connected between the input terminal to which an external reproduced signal a is supplied and a non-inversion input terminal of a comparator IC1. A voltage division smoothing section 13 is composed of a voltage dividing section including two resistors R5 and R6, and a smoothing section of a capacitor C4, which is connected between an output terminal of the envelope detection section 11 and an inversion input terminal of the comparator IC1.

In addition to the above-mentioned circuit configuration, in this second embodiment, an envelope end detection section 15 is connected between the output terminal of the envelope detection section 11 and an OR gate (logic means) 14. The envelope end detection section 15 is composed of two resistors R7 and R8, capacitor C5 and another comparator IC2. The two resistors R7 and R8 constitute another voltage division section, and this voltage division section and the capacitor C5 constitute a voltage division smoothing section 16. In this embodiment, it is possible to use the voltage division smoothing section 16 in common with the voltage division smoothing section 13, and further to input the output signal of the voltage division smoothing section 13 to a non-inversion input terminal of the comparator IC2.

In addition, a drop-out start detection section 17 is connected between the output terminal of the comparator IC1 and the OR gate 14. This drop-out start detection section 17 is composed of two retriggerable monostable multivibrators MM1 and MM2.

Figure 4:
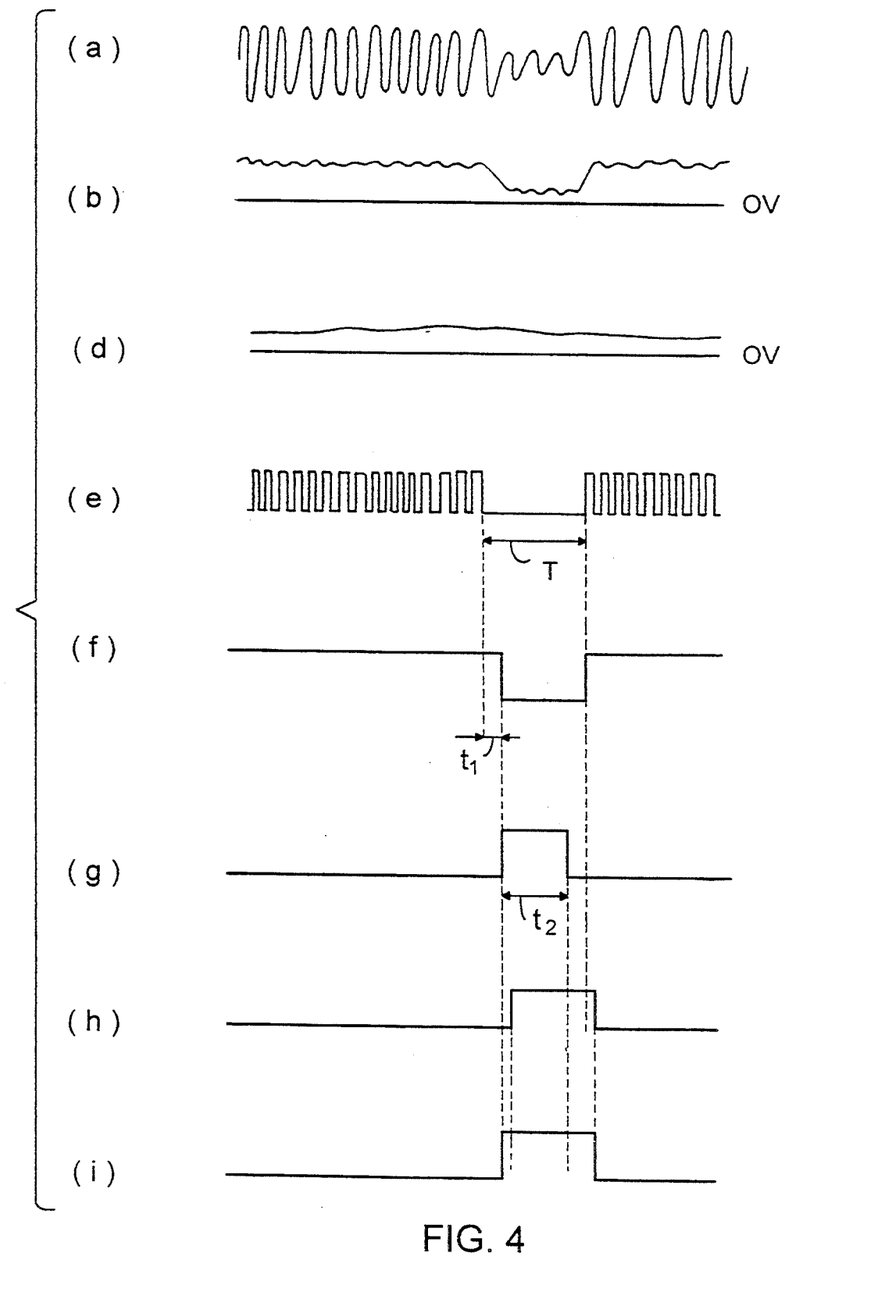
FIG. 4 is a timing chart for assistance in explaining the operation of the second embodiment shown in FIG. 3.

In the case of a magnetic recording apparatus such as a high density magnetic recording apparatus for data backup, data are divided into blocks and recorded on a magnetic tape through a magnetic recording head. Further, the signal reproduced from the magnetic tape through a magnetic reproducing head are amplified by a preamplifier (not shown) and then supplied to the envelope detection section 11. When the reproduced signal a includes a drop-out portion, for instance as shown in FIG. 4, the envelope detection section 11 detects the envelope of the reproduced signal and outputs an envelope detection signal h also as shown in FIG. 4. This envelope detection signal b outputted from the envelope detection section 11 is voltage-divided by two resistors R5 and R6 and further smoothed by capacitor C4 in the voltage division smoothing section 13, so that a reference voltage d as shown in FIG. 4 can be obtained. On the other hand, the reproduced signal a outputted by the preamplifier is passed through time constant section 12 and then supplied to the non-inversion input terminal of the comparator IC1 as a signal c. The comparator IC1 compares the reproduced signal c with the reference voltage d, so that the comparator ICI outputs an output signal e, whose level is zero at the dropout portion with a time interval T, also as shown in FIG. 4.

In the detection circuit of the present invention, since the time constant determined by resistors R5 and R6 and capacitor C4 of the voltage division smoothing section 13 is determined to be sufficiently longer that the drop-out duration time interval T, the drop-out detection level (reference voltage level d) is not lowered at the drop-out portion of the reproduced signal a, so that it is possible to eliminate the regulation of the reference voltage level. Further, the dropout detection level d (the voltage ratio to the maximum voltage of the reproduced signal a) can be determined freely by adjusting the ratio of the resistor R5 to the resistor R6.

The retriggerable monostable multivibrator MM1 is triggered by the leading edge of the output signal e of the comparator IC1, as shown in FIG. 4, to generate an output signal e having a predetermined pulse width. When this multivibrator MM1 is retriggered again by the leading edges of the other output signals f of the comparator ICI during the on-level interval of the output signal f, the on-level pulse width can be elongated. Further, the trailing edge of the output signal f of this multivibrator MM1 is delayed by a predetermined time to from the trailing edge (the start of drop-out) of the output signal e of the comparator IC1. Therefore, the start of the drop-out interval of the output signal e of the comparator ICI is detected as being delayed by a predetermined time t1.

The retriggerable monostable multivibrator MM2 is triggered by the trailing edge of the output signal f of the retriggerable monostable multivibrator MM1, and generates an output signal g having a predetermined pulse width t2. In this embodiment, the time intervals t1 and t2 are determined to be longer that the widest pulse width of the output signal e of the comparator ICI obtained when the normal reproduced signal is inputted to the drop-out detecting circuit. In the case where the output signal e of the comparator IC1 is 4 bits or less when the normal reproduced signal is supplied to the drop-out detecting circuit, it is impossible to discriminate whether the drop-out is present or not. Therefore, the time intervals t1 and t2 are usually determined to be those longer than that corresponding to 4 bits.

Figure 5:
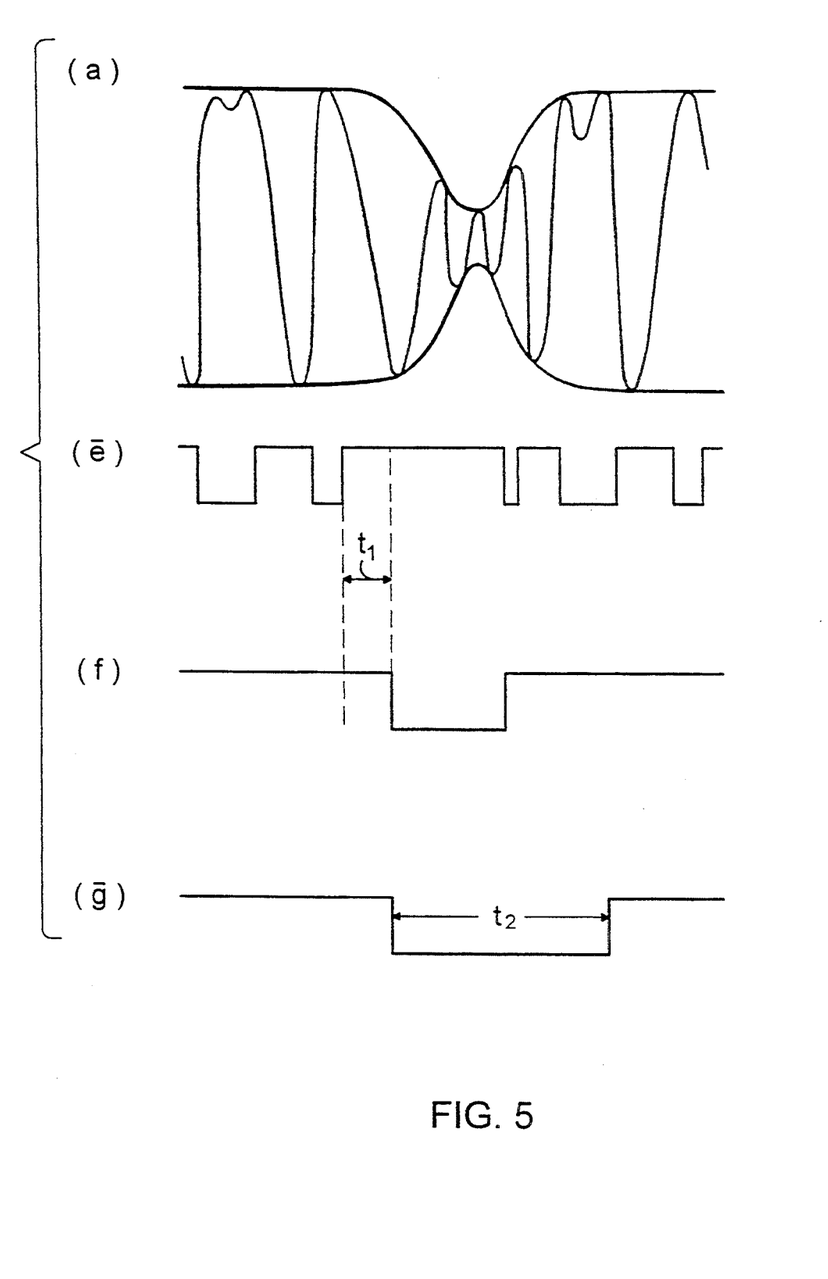
FIG. 5 is a waveform diagram for assistance in explaining the operation of the second embodiment.
Figure 6:
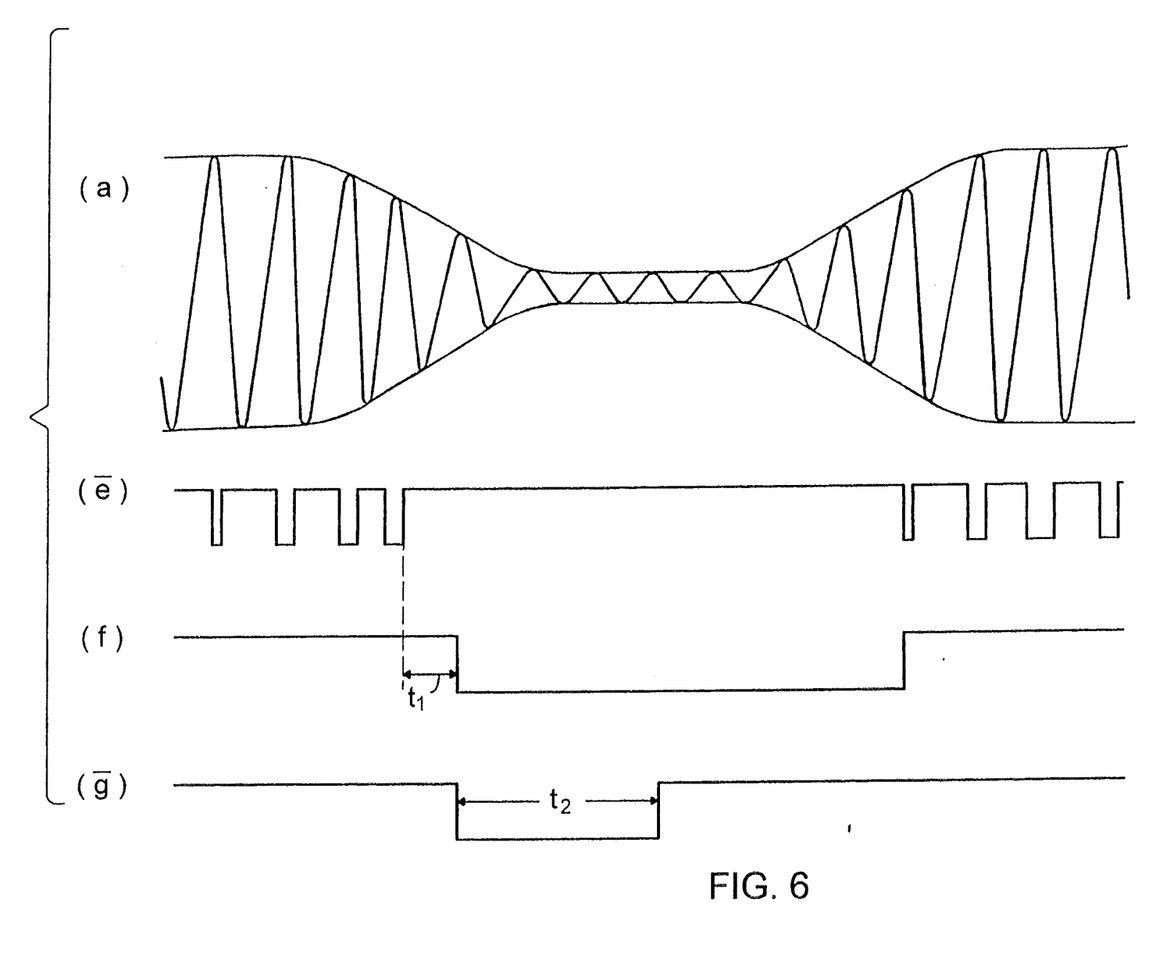
FIG. 6 is another waveform diagram for assistance in explaining the second embodiment.

In the second embodiment of the present invention as constructed above, when,the reproduced signal a includes a short drop-out as shown in FIG. 5, since the retriggerable monostable multivibrator MM2 outputs the output signal g with a width long enough, it is possible to detect a short dropout. On the other hand, when the reproduced signal a includes a long drop-out as shown in FIG. 6, since the output g of the retriggerable monostable multivibrator MM2 changes in level during the period of the drop-out interval of the reproduced signal a. In this case, therefore, the envelope end detection section detects the end of the drop-out of the reproduced signal a on the basis of the output signal b of the envelope detection section 11 and generates an output signal h at a predetermined time before the end of the drop-out.

In more detail, in the envelope end detection section 15, the output signal b of the envelope detection section 11 is voltage divided by the two resistors R7 and R8 and then smoothed by the capacitor C5 to generate the reference voltage d. Therefore, the output signal b of the envelope detection section 11 is compared with this reference voltage d by the comparator IC1 and therefore converted into a binary digital signal. Since the output signal h of this comparator IC1 is generated before the drop-out end time point of the output signal e of the comparator IC1, the envelope end detection section 15 detects the drop-out end of the reproduced signal and therefore generates an output signal h before the dropout end and further a predetermined time period t3 before the tailing edge of the output signal g of the retriggerable monostable multivibrator MM2.

The output signal h of this envelope end detection section 15 and the output signal g of the retriggerable monostable multivibrator MM2 are ORed to obtain a logical sum of both by the OR gate 14 (logical means). The waveform of this output signal i of this OR gate 14 roughly corresponds to the drop-out period T of the output signal e of the comparator IC1, as shown in FIG. 4. Therefore, it is possible to accurately detect the drop-out of the reproduced signal a even if the drop-out period is long.

Figure 7:
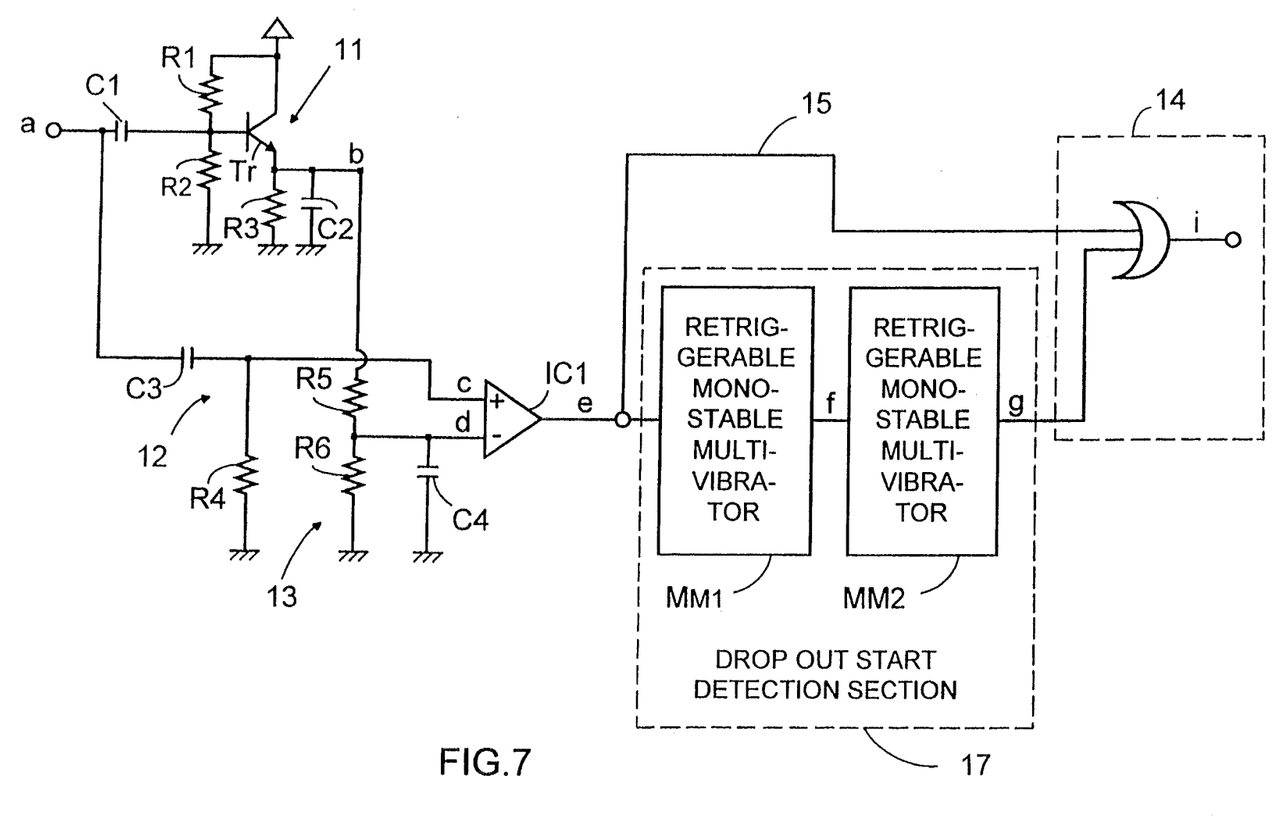
FIG. 7 is a circuit diagram showing a third embodiment of the drop-out detecting circuit according to the present invention.

A third embodiment of the present invention will be described hereinbelow with reference to FIG. 7, in which the like reference numerals have been retained for similar parts or sections which have the same functions as with the case of the second embodiment previously described.

In this third embodiment, the output signal e of the comparator IC1 is used as the output signal h of the envelope end detection section 15. Therefore, the output signal e of the comparator IC1 and the output signal g of the retriggerable monostable multivibrator MM2 are ORed to obtain a logical sum of both by the OR gate 14 (logical means). On the basis of this output signal i, it is possible to detect the drop-out of the reproduced signal a accurately.

As described above, in the drop-out detecting circuit of the present invention, since the detecting circuit is provided with the envelope detection section for detecting the envelope of the reproduced signal; the voltage division section for dividing the output signal voltage of the envelope detection section; and the comparator for comparing the output signal of the voltage division section with the reproduced signal to detect the drop-out of the reproduced signal, it is possible to determine the drop-out detection level to be constant, without regulating the output level of the magnetic recording head and the gain of the preamplifier, thus reducing the number of parts and the number of adjustment processes so as to reduce the manufacturing cost thereof.

In another embodiment of the present invention, since the detecting circuit further comprises the drop-out start detection section for detecting the drop-out start of the reproduced signal on the basis of the output signal of the comparator and generating the output signal at a predetermined time after the drop-out start of the reproduced signal; the drop-out end detection section for detecting the drop-out end of the reproduced signal on the basis of the output signal of the envelope detection section and generating the output signal at a predetermined time period before the end of the drop-out of the reproduced signal; and the logical means for obtaining a logical sum of the output signal of the drop-out end detection section and the output signal of the drop-out start detection section, it is possible to detect the drop-out portion throughout as defective tape locations, irrespective of the length of the drop-out portion, in spite of the simple circuit configuration.

While the foregoing description and drawings represent the preferred embodiments of the present invention, it will be obvious to those skilled in the art that various changes and modifications may be made therein without departing from the true spirit and scope of the present invention.

What is claimed is:

1. In a magnetic recording apparatus for data back-up having a magnetic reproducing head and a drop-out circuit for detecting the level of the signal reproduced by the magnetic reproducing head and determining whether said level is less than that of a reference level, the improvement comprising that said drop-out circuit includes:

an envelope detection section for detecting an envelope of reproduced signal;

a voltage division section for dividing a voltage of an output signal of said envelope detection section;

a comparator for comparing an output signal of said voltage division section with the reproduced signal to detect a drop-out of the reproduced signal;

a drop-out start detection section for detecting a drop-out start of the reproduced signal on the basis of the output signal of said comparator and for generating an output signal at a predetermined time after a start of a drop-out of the reproduced signal detected by said comparator;

a drop-out end detection section for detecting an end of a drop-out of the reproduced signal on the basis of the output signal of said envelope detection section and for generating an output signal at a predetermined time before the detected drop-out end; and logical means for generating an output signal when any one of the output signal of said drop-out end detection section and the output signal of said drop-out start detection section is generated.

2. In a magnetic recording apparatus for data back-up having a magnetic reproducing head and a drop-out circuit for detecting the level of the signal reproduced by the magnetic reproducing head and determining whether said level is less than that of a reference level, the improvement comprising that said drop-out circuit includes:

an envelope detection section for detecting an envelope of reproduced signal;

a voltage division section for dividing a voltage of an output signal of said envelope detection section;

a comparator for comparing an output signal of said voltage division section with the reproduced signal to detect a drop-out of the reproduced signal;

a drop-out start detection section for detecting a drop-out start of the reproduced signal on the basis of the output signal of said comparator and for generating an output signal at a predetermined time after a start of a drop-out of the reproduced signal detected by said comparator;

a drop-out end detection section for detecting a drop-out of the reproduced signal on the basis of the output signal of said comparator and for generating an output signal at a predetermined time before the detected drop-out end; and logical means for generating an output signal when any one of the output signal of said drop-out end detection section and the output signal of said drop-out start detection section is generated.

* * * * *